US009235601B2

(12) United States Patent
Kassab et al.

(10) Patent No.: US 9,235,601 B2
(45) Date of Patent: *Jan. 12, 2016

(54) DATA MINING SHAPE BASED DATA

(71) Applicant: International Business Machines Corporation, Armonk, NY (US)

(72) Inventors: Maroun Kassab, St. Eustache (CA); Leah M. Pastel, Essex, VT (US); Adam E. Trojanowski, Chester, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,151

(22) Filed: Feb. 15, 2013

(65) Prior Publication Data

US 2014/0149458 A1    May 29, 2014

Related U.S. Application Data

(63) Continuation of application No. 13/685,042, filed on Nov. 26, 2012.

(51) Int. Cl.
*G06F 17/30* (2006.01)
*G06K 9/32* (2006.01)
*G06T 7/00* (2006.01)

(52) U.S. Cl.
CPC .... *G06F 17/30256* (2013.01); *G06F 17/30539* (2013.01); *G06K 9/3241* (2013.01); *G06T 7/0004* (2013.01); *G06T 2207/30148* (2013.01)

(58) Field of Classification Search
CPC ............... G06T 2207/30148; G06T 17/30256; G06T 17/30601

USPC ............. 382/144, 145, 149, 181; 706/14, 46; 703/16; 716/12; 707/737
See application file for complete search history.

(56) References Cited

U.S. PATENT DOCUMENTS 6,880,136 B2    4/2005 Huisman et al.
7,113,628 B1    9/2006 Obara et al.
(Continued)

FOREIGN PATENT DOCUMENTS

WO    2008111037 A2    9/2008
WO    2009103046 A2    8/2009
(Continued)

OTHER PUBLICATIONS

Woodruff, et al., "Using Thumbnails to Search the Web". Proceedings of the SIGCHI Conference on the Human Factors in Computing Systems, SIGCHI'01, Mar. 31-Apr. 4, 2001, Seattle, WA, USA, pp. 198-205.
(Continued)

*Primary Examiner* — Thu-Nguyet Le
(74) *Attorney, Agent, or Firm* — Cantor Colburn LLP; Feb Cabrasawan

(57) ABSTRACT

Embodiments of the disclosure include a method for data mining shape based data, the method includes receiving shape data for each of a plurality of data entries and creating a first abstract from the shape data for each of the plurality of data entries. The method also includes organizing the first abstracts into a plurality of groups based on a criterion and creating a second abstract for each data entry in the plurality of groups based on the criterion and information derived from the first abstract.

6 Claims, 4 Drawing Sheets

(56) References Cited

U.S. PATENT DOCUMENTS

| | | |
|---|---|---|
| 7,171,039 B2 | 1/2007 | Kondo et al. |
| 8,156,121 B2 | 4/2012 | Reese et al. |
| 8,156,132 B1 | 4/2012 | Kaminski, Jr. |
| 8,156,152 B2 | 4/2012 | Zou et al. |
| 2002/0181756 A1* | 12/2002 | Shibuya et al. ............... 382/145 |
| 2006/0274933 A1* | 12/2006 | Obara et al. ................. 382/149 |
| 2007/0166765 A1 | 7/2007 | Rohlff |
| 2008/0058977 A1* | 3/2008 | Honda ......................... 700/110 |
| 2008/0109454 A1 | 5/2008 | Willse et al. |
| 2009/0311180 A1 | 12/2009 | Rohlff |
| 2009/0318311 A1 | 12/2009 | Smythe et al. |
| 2010/0021049 A1 | 1/2010 | Nikaido |
| 2010/0067779 A1 | 3/2010 | Reich et al. |
| 2010/0070448 A1 | 3/2010 | Omoigui |
| 2010/0131205 A1 | 5/2010 | Berkovitch et al. |
| 2010/0223276 A1 | 9/2010 | Al-Shameri et al. |
| 2010/0223678 A1 | 9/2010 | Rohlff |
| 2010/0310150 A1* | 12/2010 | Hayashi et al. ............... 382/145 |
| 2011/0172826 A1 | 7/2011 | Amodei |
| 2011/0276935 A1* | 11/2011 | Fouquet et al. ............... 716/112 |

FOREIGN PATENT DOCUMENTS

| | | |
|---|---|---|
| WO | 2010061771 A1 | 6/2010 |
| WO | 2012046431 A1 | 4/2012 |

OTHER PUBLICATIONS

Zhong, et al. "A Clustering Technique for Defect Inspection". Proceedings of the 6th WSEAS International Conference on Evolutionary Computing, Lisbon, Portugal, Jun. 16-18, 2005, pp. 281-284.

International Search Report and the Written Opinion of the International Searching Authority, or the Declaration; Date of Mailing: Feb. 13, 2014, for International Application No. PCT/US2013/064206; Filing Date: Oct. 10, 2013.

* cited by examiner

DATA MINING SHAPE BASED DATA

CROSS REFERENCE TO RELATED APPLICATIONS

This application is a continuation of U.S. application Ser. No. 13/685,042 filed on Nov. 26, 2012 entitled DATA MINING SHAPE BASED DATA, the entire contents of which are incorporated herein by reference.

BACKGROUND

The present invention relates to data mining, and more specifically, to data mining shape based data.

There are many data analysis applications where shapes based data may provide important information, such as data associated with design specifications, layouts, plans, routes, traces or maps. Data analysis can be enhanced by depicting data as shapes for the analysis or including layout information in the analysis, such as critical path analysis or diagnostics data analysis for yield learning. Currently, for diagnostics data analysis, tests are performed on devices, such as semiconductor integrated circuit wafer tests, to detect possible errors in the devices. Some of these tests are diagnosable and produce diagnostic data that relate to possible errors in the devices. Diagnostic data are typically stored in a database and reviewed in an attempt to identify possible causes or similarities in the detected errors. The diagnostic results may include large amounts of associated shape based layout data. As a result of the large quantity of data produced, reviewing the diagnostic data to detect the presence of systematic errors or defects in the devices is a difficult and time consuming task.

SUMMARY

Embodiments include a method for data mining shape based data, the method includes receiving shape data for each of a plurality of data entries and creating a first abstract from the shape data for each of the plurality of data entries. The method also includes organizing the first abstracts into a plurality of groups based on a criterion and creating a second abstract for each data entry in the plurality of groups based on the criterion and information derived from the first abstract.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, a method for data mining shape based data is provided. In one embodiment, diagnostic tests are performed on a plurality of semiconductor chips, or other devices, and errors or defects detected during the diagnostic tests are saved as data entries in a table or database. Each of the data entries includes shape data associated with the detected error or defect. In exemplary embodiments, a first abstract is created based on the shape data for each of the data entries and the first abstracts are organized into groups of potentially related data entries based on a criterion. In exemplary embodiments, the criterion may be one or more properties of the first abstracts. In exemplary embodiments, the first abstract may be a visual representation of one or more characteristics of the shape data. For example, the first abstract may be a graphical illustration of the location of the detected error on the semiconductor chip. After groups of data entries are identified, a second abstract is then created for each of the data entries in the group based on the criterion. The second abstract is chosen based on information derived from the first abstract and the data of the entries in the group. In exemplary embodiments, the second abstract is a visual representation of the shape data that is different than the first abstract. For example, the second abstract may be a graphical representation with a different scale or orientation than the first abstract. In exemplary embodiments, a correlation between the data entries in the group can be determined based on a comparison, classification, or categorization of the second abstracts.

Figure 1:
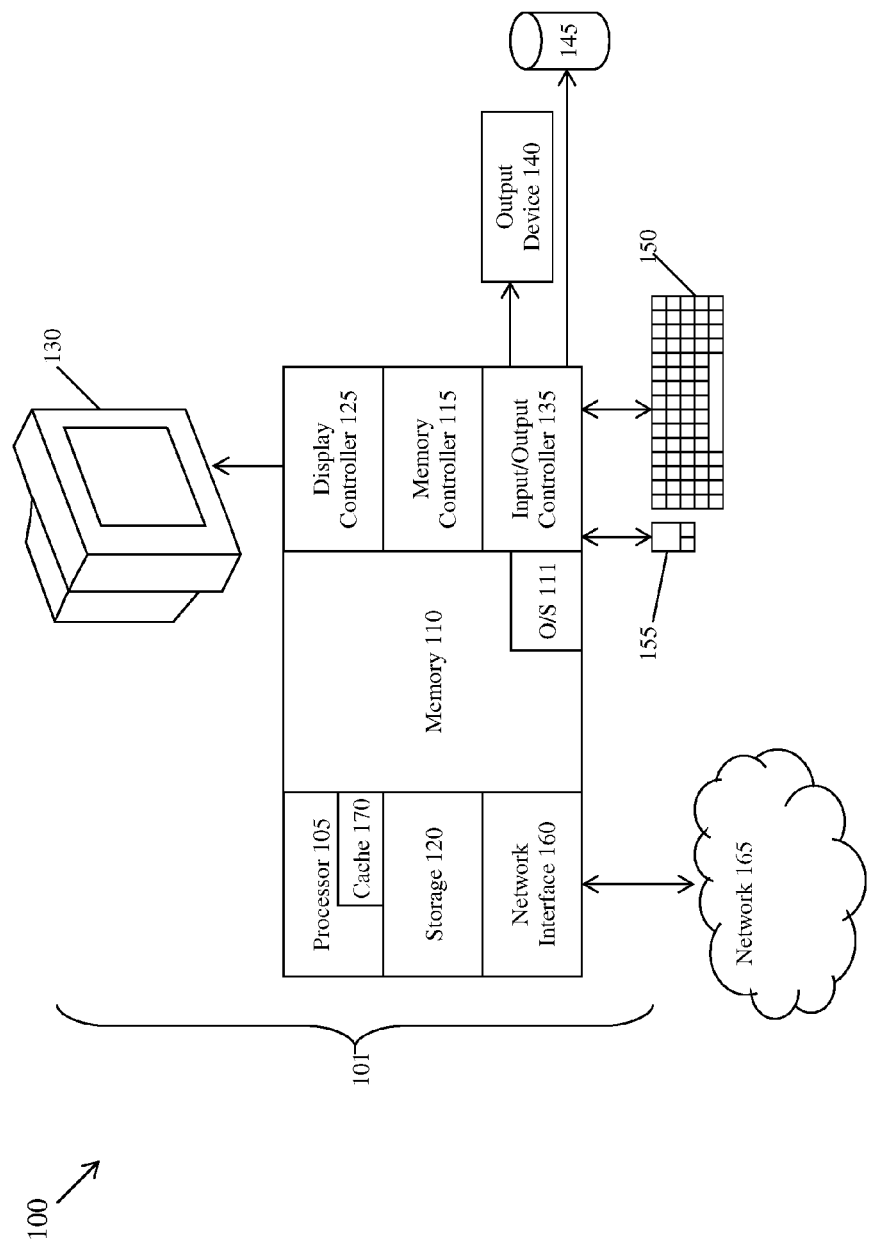
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

Figure 2:
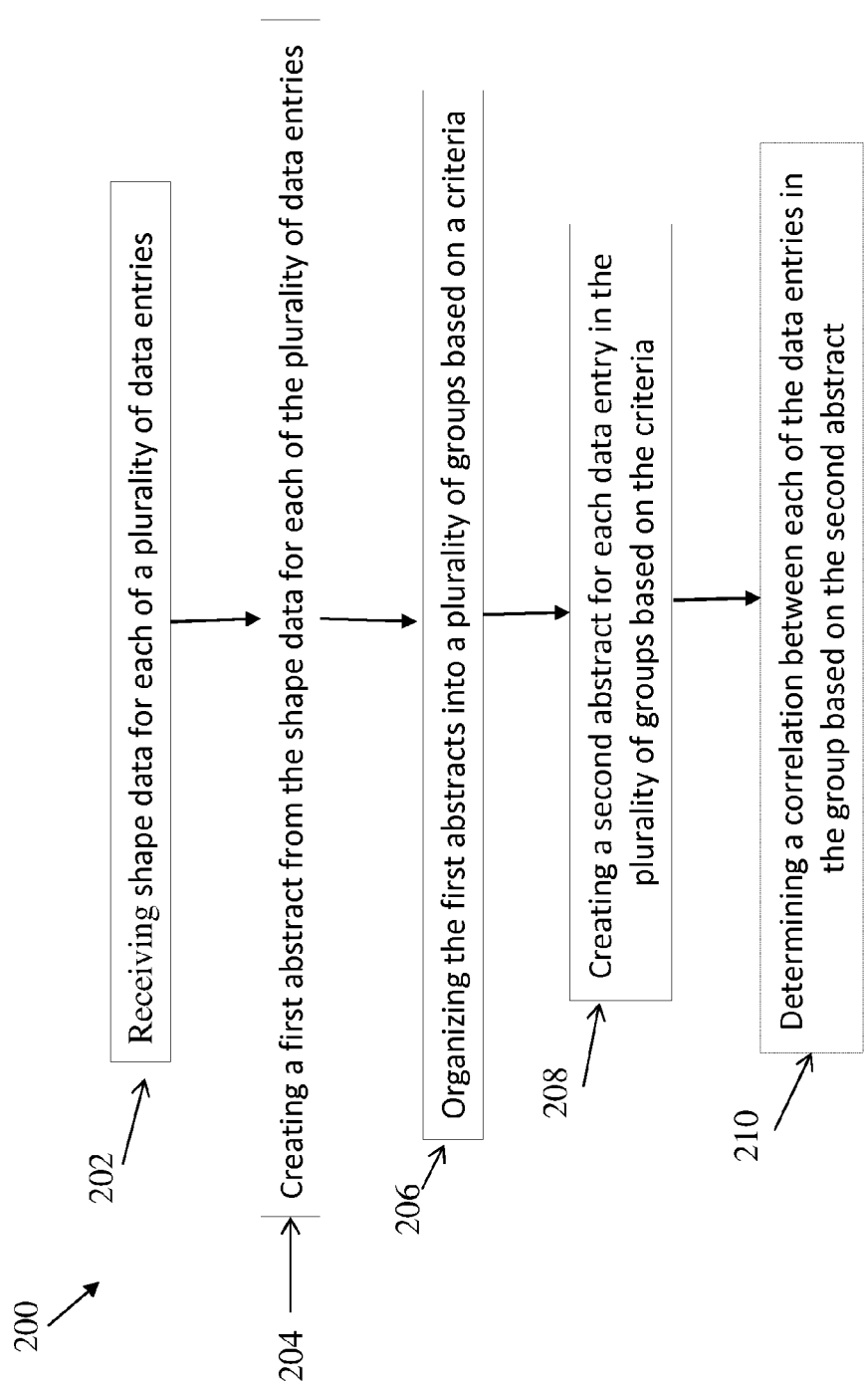
FIG. 2 illustrates a flow diagram of a method for data mining shape based data in accordance with an embodiment.

Referring now to FIG. 2, a flow chart illustrating a method 200 for data mining shape based data in accordance with an embodiment is shown. As shown at block 202, the method 200 includes receiving shape data for each of a plurality of data entries. Next, as shown at block 204, the method 200 includes creating a first abstract from the shape data for each of the plurality of data entries. After the first abstracts are created, the first abstracts are organized into a plurality of groups based on a criterion, as shown at block 206. In exemplary embodiments, the criterion may include a wide range of properties of the first abstracts that are selected to group abstracts that have similar properties or traits into groups. For example, the criterion may include, but is not limited to, a location of the detected error, an aspect ratio of the detected error, the general shape of the detected error (i.e., horizontal or vertical bar), or the like. Next, as shown at block 208, the method 200 includes creating a second abstract for each data entry in the plurality of groups based on the criterion. For example, if one or more of the first abstracts are placed into a group based on the location of the detected error, the second abstracts may be created to show a more detailed view of the common location. Optionally, as shown at block 210, the method 200 may include determining a correlation between each of the data entries in the group based on the second abstract.

In exemplary embodiments, the first and second abstracts are based on, and may illustrate, one or more characteristics of the shape data. The characteristic of the shape data may include location information of the detected defect, such as the location of the error on the chip. Characteristics of the shape data may also include information, such as the shape or type of the detected defect. Characteristics of the shape data may further include information about the device or test, such as a lot, wafer, or chip identification, test type, test identification, error score, test date, and layer, circuit, net or pin information, or power or performance or other variables that can be associated with shape data.

In exemplary embodiments, a group of multiple data entries may be identified by comparing the first abstracts associated with each of the data entries and grouping data entries that have one or more characteristics in common. For example, data entries that have detected errors of a similar shape or in a similar location on a chip may be identified as a group. In exemplary embodiments, the data entries may be filtered based on the one or more characteristics of the shape data prior to identifying groups of data entries. For example, the data entries may be filtered such that only data entries with error scores above a predetermined threshold are considered for grouping.

In exemplary embodiments, creating abstracts of the shape data and organizing the shape data into groups based on criterion facilitate the comparison of the shape data and simplify the process of identifying potential similarities in the shape data. In exemplary embodiments, the shape data for the plurality of data entries includes a large amount of data which makes the comparison of the shape data difficult. However, by abstracting the shape data and looking for similarities in the abstracts, the comparison of the shape data can be simplified. In exemplary embodiments, the abstraction and grouping of the shape data based on criterion and information derived from the abstracts are iterative processes that can be repeated multiple times with various criterion and abstract definitions applied during each iteration.

In exemplary embodiments, the first abstract may be a graphical representation of the shape data that displays a first characteristic of the shape data and the second abstract may be a graphical representation of the shape data that displays a second characteristic of the shape data. The abstracts can include graphical representations of the shape data that utilize various shapes, colors, and other means for representing the characteristic of the shape data. For example, the shape of the graphical representation may be indicative of the shape of the detected error, while the color may be used to indicate the severity of the detected error. In exemplary embodiments, the scale or size of the first abstract and second abstract may be different such that various characteristics can be illustrated or emphasized. For example, the first abstract may have a first scale that is selected to adequately illustrate a location of a detected error on a chip and the second abstract may have a scale that is an order of magnitude smaller to adequately illustrate the shape of the detected error.

In exemplary embodiments, a correlation between data entries in the identified group can be determined based on a comparison of the second abstracts. In exemplary embodiments, the second abstracts may be created based on a different characteristic than the characteristic used to create the first abstract. Furthermore, the characteristic used to create the second abstract is selected based on the criterion used to group the first abstracts and information derived from the first abstracts. For example, if the criterion used to group a plurality of first abstracts is the location of a detected error then a group with locations within a certain section of the layout may be further analyzed using a second abstract definition based on the section of the layout indicated by the first abstract.

In one embodiment, a user may be able to select the characteristic that the second abstract is created on and may be able to sort the second abstracts based on the correlation. In exemplary embodiments, the correlation between the second abstracts can be used to detect similarities in the shape data that indicates underlying systematic causes of the detected error. Likewise, the correlation between the second abstracts can be used to detect the absence of similarities in the shape data that indicate that the detected errors may be unrelated or random defects.

In exemplary embodiments, an abstract is created from the shape based data because the shape based data generated by the diagnostic process is often complex and imprecise. Diagnostics results are error or defect candidates. For example, the shape based data may contain shapes and layers that are not actually defective, as well as the actual detected defect. In addition, a comparison of the entire shape based data, i.e., non-abstracted data, will lead to only exact matches, while a comparison of the abstracted shape data may enable a so called fuzzy comparison and reveal more subtle matches. Furthermore, by creating levels of abstraction that hide details of the shape based data the quantification of similarities is simplified, making automation of the comparison of the abstractions possible.

In exemplary embodiments, abstractions may be used for multiple purposes including, but not limited to, autonomous data mining, user guided data mining (semi-automatic processing), and data presentation for user-machine interactions. In one embodiment, multiple abstractions may be applied to the shape based data including, but not limited to, layer, wiring length, number of vias, number of non-redundant vias, number of connected components, highest layer, bounding box of all shapes, bounding box for each layer, bounding box for each polygon, number of transistors, size of driving transistor, ratio of capacitances to VDD and GND, shape pattern, combinations of shapes, structures, image features, angles, any comparable property. In exemplary embodiments, the abstracts may be organized into groups based a quantification of similarity that can use linear or logarithmic intervals.

Figure 3:
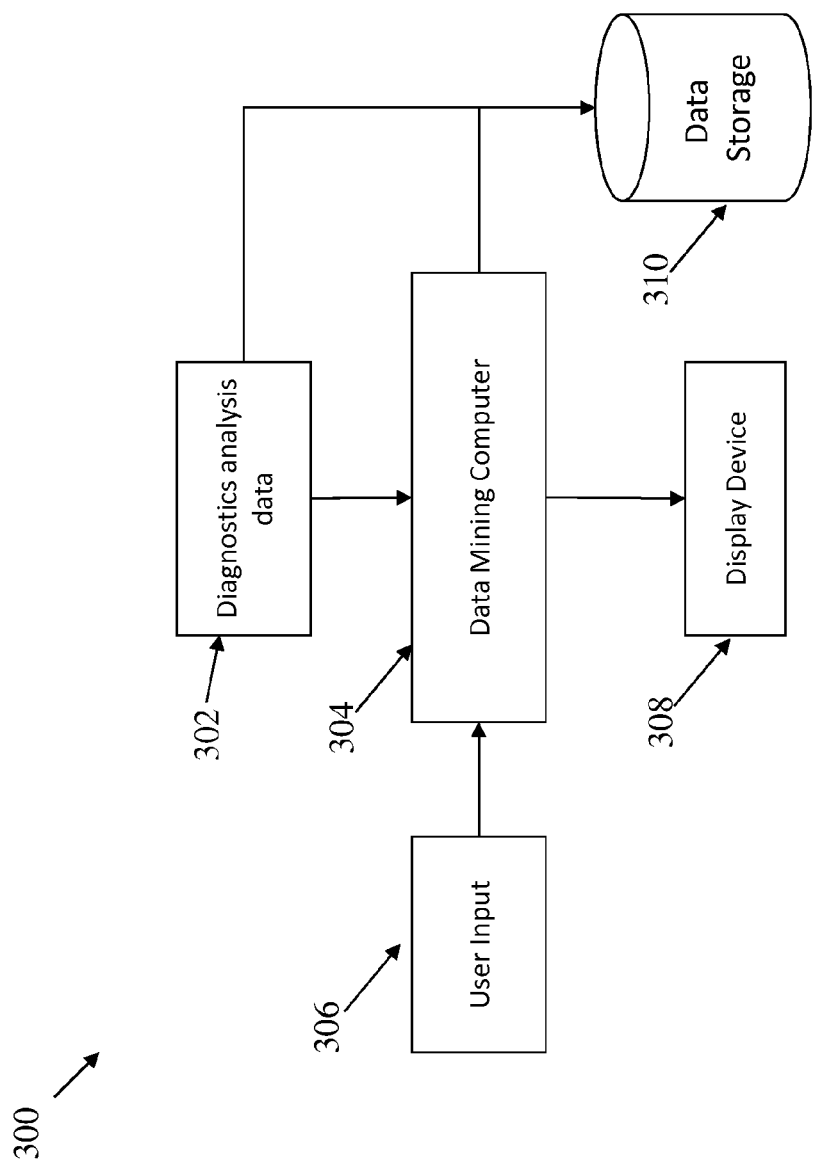
FIG. 3 illustrates a block diagram of a system for data mining shaped based data in accordance with an embodiment.

Referring now to FIG. 3, a block diagram of a system 300 for data mining shape based data in accordance with an embodiment is shown. The system 300 includes a data mining computer 304, which may be similar to the computer shown in described with reference to FIG. 1. The data mining computer 304 is configured to receive analysis input data, such as diagnostics results from test and diagnosis simulation, device logistics data, and shapes data. In addition, the system 300 includes a data storage device 310, which is configured to store the analysis input data 302. In exemplary embodiments, the data storage device 310 may be part of the data mining computer 304 or the data storage device 310 may be embodied in a separate device. The data mining computer 304 is also configured to receive user input 306. In exemplary embodiments, the user input 306 may be used by the data mining computer 304 to select the characteristics used in creating the first and/or second abstracts, in sorting the abstracts, in grouping the abstracts, or the like. The data mining computer 304 is further configured to display the abstracts on a display device 308, which may be part of the data mining computer 304 or may be embodied in a separate device.

Figure 4:
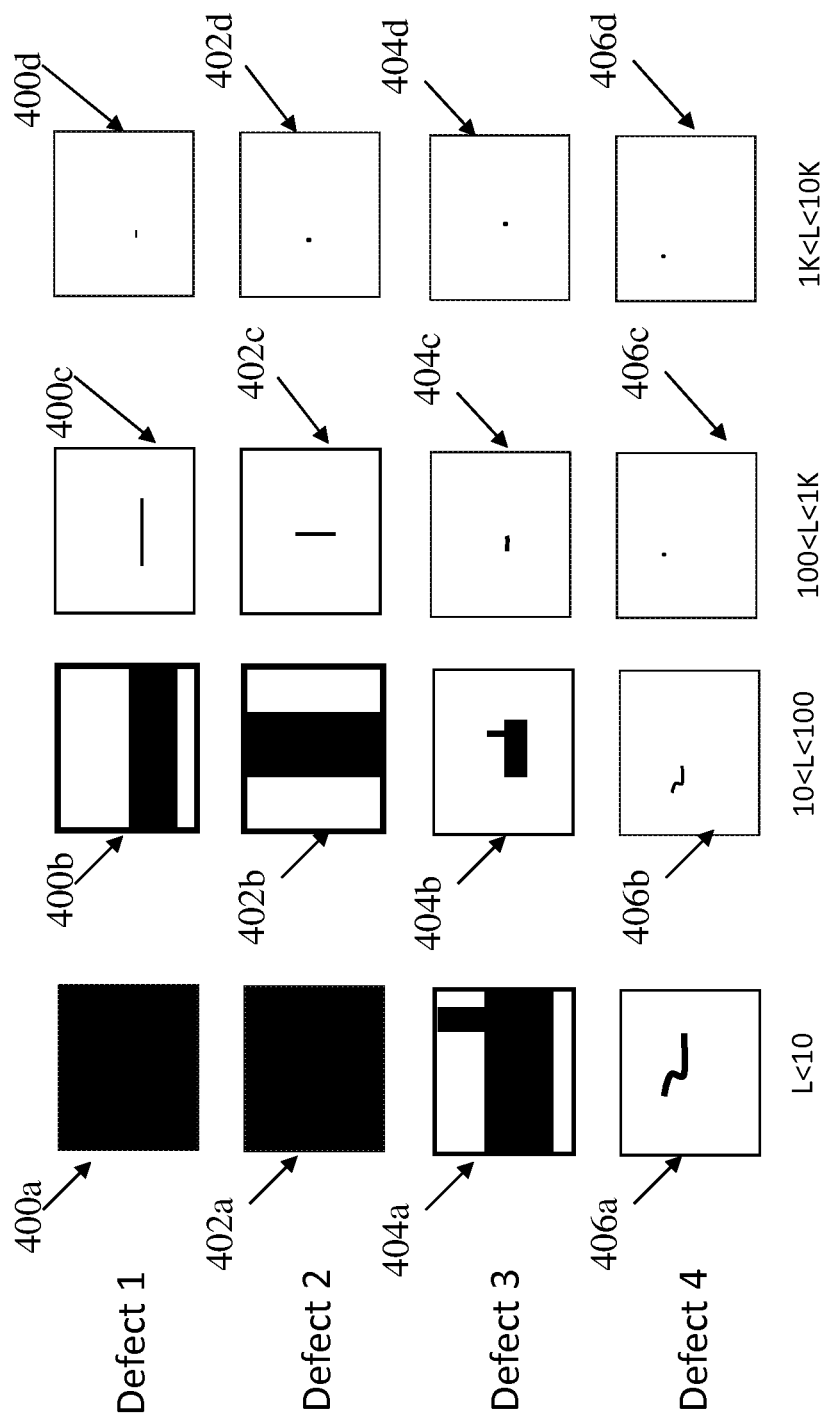
FIG. 4 illustrates a plurality of abstracts for multiple detected errors in accordance with an embodiment.

Referring now to FIG. 4, a plurality of abstracts illustrating shape data for multiple detected errors in accordance with an embodiment is shown. As illustrated four exemplary defects are shown and each defect is represented by four abstracts. Abstracts 400a, 400b, 400c and 400d all illustrate a first defect in a different scale; Abstracts 402a, 402b, 402c and 402d all illustrate a second defect in a different scale; Abstracts 404a, 404b, 404c and 404d all illustrate a third defect in a different scale; and Abstracts 406a, 406b, 406c and 406d all illustrate a fourth defect in a different scale. As illustrated, various abstracts can be utilized to illustrate different characteristics of shape data corresponding to a detected error. For example, abstracts 400d, 402d, 404d and 406d may be used to illustrate a location of a detected error while abstracts 400b, 402b, 404b and 406b may be used to illustrate a shape of the detected error. In exemplary embodiments, the abstracts created and used by the data mining system may have different scales, different orientations, or may be based on different characteristics of the shape data for the detected errors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for data mining shape based data, the method comprising:
   receiving, by a processor, a shape data for each of a plurality of data entries;
   creating, by the processor, a first abstract from the shape data for each of the plurality of data entries, wherein the first abstract is a graphic illustration of a location of a detected error on a semiconductor chip;
   organizing, by the processor, the first abstracts into a plurality of groups based on a first criterion, wherein the first criterion is the location of the detected error;
   creating, by the processor, a second abstract for each data entry in the plurality of groups based on a second criterion, wherein the second criterion is the shape of the detected error, and information derived from the first abstract, wherein the second abstract is a visual representation of the detected error on the semiconductor chip that illustrates a more detailed view of a common location of detected errors; and
   determining a correlation between each of the data entries in the group based on the second abstract, wherein similarities in the shapes of the detected errors in the common location indicate that the detected errors are not random defects.

2. The method of claim 1, wherein the first abstract includes a characteristic of the shape data.

3. The method of claim 2, wherein each of the plurality of groups of data entries have at least one common characteristic.

4. The method of claim 1, wherein the second abstract includes a second characteristic of the shape data and the correlation is based on a similarity of the second characteristic.

5. The method of claim 1, further comprises displaying a graphical representation of the second abstracts.

6. The method of claim 5, further comprising:
   sorting the graphical representation of the second abstracts based on the correlation.

* * * * *